US007369023B2

(12) United States Patent
Frank et al.

(10) Patent No.: US 7,369,023 B2
(45) Date of Patent: May 6, 2008

(54) METHOD FOR MANUFACTURING A MAGNET ARMATURE

(75) Inventors: Dieter Frank, Hannover (DE); Siegfried Höfler, Hannover (DE); Armin Sieker, Bielefeld (DE)

(73) Assignee: WABCO GmbH & Co., OHG, Hannover (DE)

( * ) Notice: Subject to any disclaimer, the term of this patent is extended or adjusted under 35 U.S.C. 154(b) by 1127 days.

(21) Appl. No.: 10/100,514

(22) Filed: Mar. 18, 2002

(65) Prior Publication Data
US 2002/0135451 A1 Sep. 26, 2002

(30) Foreign Application Priority Data
Mar. 20, 2001 (DE) ................ 101 13 316

(51) Int. Cl.
*H01F 3/00* (2006.01)
(52) U.S. Cl. ................ 335/279; 29/604; 29/602.1
(58) Field of Classification Search ............. 29/602.1, 29/604, 607; 335/279
See application file for complete search history.

(56) References Cited

U.S. PATENT DOCUMENTS

| 4,073,059 | A | * | 2/1978 | Wallace et al. | ............. 30/261 |
| 4,149,132 | A | * | 4/1979 | Richter et al. | ............ 335/262 |
| 4,862,127 | A | | 8/1989 | Lundstrom et al. | |
| 5,326,070 | A | | 7/1994 | Baron | |
| 6,019,344 | A | * | 2/2000 | Engel et al. | ................. 251/64 |
| 6,105,931 | A | | 8/2000 | Frank et al. | |
| 6,225,886 | B1 | * | 5/2001 | Kleinert et al. | ............ 335/257 |
| 6,390,445 | B2 | * | 5/2002 | Fukano | ............... 251/129.19 |
| 6,913,242 | B2 | * | 7/2005 | Reichert et al. | ....... 251/129.18 |
| 7,062,889 | B2 | * | 6/2006 | Bienick et al. | ............ 52/784.1 |
| 2005/0064212 | A1 | * | 3/2005 | Dunlap | ..................... 428/457 |

FOREIGN PATENT DOCUMENTS

| DE | 975 662 C | 4/1962 |
| DE | 31 32 396 C2 | 3/1983 |
| DE | 89 13 163.0 U | 2/1990 |
| DE | 43 15 013 A1 | 11/1994 |

(Continued)

*Primary Examiner*—Elvin Enad
*Assistant Examiner*—Bernard Rojas
(74) *Attorney, Agent, or Firm*—Kramer Levin Naftalis & Frankel LLP (57) ABSTRACT

A method for manufacturing magnet armatures which are used mainly in brake-pressure modulators of electronically controlled brake systems and which are provided on their entire surface with a plastic coating, for reasons of dimensional stability and sliding properties. Magnet armatures of this type are constructed as cylindrical members and are usually provided in the region of one of the two end faces with an elastomeric sealing element, which according to the prior art is bonded to the magnet armature by vulcanization, an adhesive elastomer-to-metal bond being formed between the magnet armature and the elastomeric sealing element during vulcanization. Since bonds of this type are not possible for a completely coated magnet armature, the elastomer for the elastomeric sealing element is, according to the invention, vulcanized onto the armature without using an adhesion promoter. The resulting absence of nonpositive bonding between the elastomeric sealing element and the magnet armature is replaced by the structural feature of an interlocking relationship between the magnet armature and the elastomer. The interlocking relationship is achieved by an undercut in the magnet armature.

64 Claims, 5 Drawing Sheets

FOREIGN PATENT DOCUMENTS

| | | |
|---|---|---|
| DE | 693 10 261 T2 | 2/1997 |
| DE | 197 30 276 A1 | 1/1999 |
| DE | 197 54 525 C1 | 4/1999 |
| DE | 100 09 117 A1 | 8/2001 |
| EP | 0 300 280 A1 | 1/1989 |
| EP | 0 565 292 B1 | 10/1993 |
| EP | 0 623 772 A2 | 11/1994 |
| GB | 983174 | 2/1965 |
| GB | 2 138 636 A | 10/1984 |
| WO | WO 91/15771 A1 | 5/1997 |

* cited by examiner

| | EBS/PRIOR ART | ABS/PRIOR ART | INVENTION |
|---|---|---|---|
| END PRODUCT |  |  |  |
| TOTAL MANUFACTURING COSTS | 100% | 65% | 45% |

| | EBS/PRIOR ART | ABS/PRIOR ART | INVENTION |
|---|---|---|---|
| TOTAL MANUFACTURING COSTS | 0 | + | ++ |
| MAGNETIC PROPERTIES | 0 | 0 | + |
| WEAR RESISTANCE | 0 | -- | 0 |
| CORROSION RESISTANCE | 0 | 0 | + |

FIG. 4a

POSSIBLE UNDERCUTS

RECESSED GROOVE

INCLINED SECTION

THREAD

TOOTHING

FIG. 4b

POSSIBLE UNDERCUTS

RECESSED GROOVE

INCLINED SECTION

THREAD

TOOTHING

FIG. 5

METHOD FOR MANUFACTURING A MAGNET ARMATURE

BACKGROUND OF THE INVENTION

The present invention relates to a method for manufacturing magnet armatures.

German Patent Application DE 19730276 A1 [hereinafter referred to as E1] teaches that it is advantageous to provide the magnet armature of a solenoid valve with a plastic coating, for reasons of dimensional stability and sliding properties thereof. FIG. 2 therein describes a 3/2-way valve, in other words a valve with two valve seats, representing the maximum possible number of valve seats in the embodiment with only one magnet armature.

On the valve closure face [(3) therein] of the armature [(1) therein] there is provided a coating which prevents damage to the face when this strikes the valve seat [(4) therein] upon actuation of the magnet.

When the magnet actuation is turned off, the second closure face [(19) therein] is caused by the action of the restoring spring to strike the second valve seat [(20) therein], whereby it is further advantageous to provide a coating on the second valve closure face as well for protection against damage. Furthermore, the faces [(6) therein] of the armature in contact with the guide device [(5) therein] are provided with a coating to increase sliding capability.

Finally, it is proposed that the entire armature be provided with a coating in one working cycle, for example by immersion. This very cost-effective total coating of the magnet armature is possible for the valve types presented therein, but all valve seats shown therein are designed as metal-to-metal sealing seats, which do not have a hermetic seal.

In the case of application in pilot units for brake-pressure modulators of electronically controlled brake systems in vehicles, there are usually provided in each channel at least three pilot valves ["air admission", "venting", redundant pressure function], which are designed as solenoid valves but which must have a hermetically sealing valve seat in their closed position, to ensure that the pressure in the control chamber of the downstream relay valve is maintained when the pilot valves are not actuated. The function and principle of action of such pilot solenoid valves is described in German Patent Application 10009117.2, which does not represent a prior disclosure, and which is referred to hereinafter as E2.

FIG. 4 of E2 illustrates the valve types with which such pilot units can be constructed: They comprise a 2/2-way valve which is closed when the energizing current is off [(43) and (44) in FIG. 4 therein], a 2/2-way valve which is open when the energizing current is off [(45) and (46) in FIG. 4 therein] and a 3/2-way valve [(47) and (48) in FIG. 4 therein].

For each of the cited valve types there is shown in FIG. 4 therein the magnet armature [(39) therein], which is provided at one end with a molding [(42) therein] for formation of a metal-to-metal sealing seat that is not hermetically sealing, and at the other end with an elastomeric insert [(41) therein] for formation of the hermetically sealing valve seat.

The magnet armatures according to FIG. 4 of E2 cannot, however, be equipped with a total coating such as proposed in E1.

The reason for this is that the elastomeric inserts according to FIG. 4 of E2 are vulcanization-bonded into corresponding cavities of the magnet armatures, and so an adhesive elastomer-to-metal bond exists between the ferromagnetic base material of the magnet armature and the elastomeric insert.

This metal-to-elastomer bond is produced with the help of an adhesion promoter which acts between the base metal and the elastomer in the manner explained hereinafter. Because the adhesion promoter has extremely sensitive functional ability, however, it is effective only if a well prepared metal surface is present, as explained hereinafter; the use of such a thin plastic coating between the base metal and the elastomeric insert rules out any secure adhesion of this insert. For this reason a plastic coating of the cavity for the elastomeric insert is not possible, whereby total coating of the magnet armature for such pilot solenoid valves is ruled out.

The foregoing explanations about FIG. 4 of E2 are familiar as such to those skilled in the art; E2, which is not a prior disclosure, is mentioned here merely because FIG. 4 therein illustrates the common types of pilot valves all together.

Accordingly, it is desired to provide a method for manufacturing magnet armatures, while overcoming the disadvantages associated with prior art methods and magnetic armatures.

SUMMARY OF THE PRESENT INVENTION

Generally speaking, in accordance with the present invention, an improved method for manufacturing magnet armatures is provided. The method of the present invention has the advantage that the total manufacturing costs are much lower than those of prior art methods. Additionally, the method of the present invention is less critical on the whole since, compared with the prior art, the process most susceptible to defects during manufacture, or in other words the formation of an adhesive elastomer-to-metal bond, no longer takes place.

In one aspect of the present invention, a method for producing a magnet armature to be used in a valve mechanism for controlling an electronic braking system is provided including the steps of manufacturing a magnet armature including an armature region for an elastomeric sealing element, coating an outer surface of the magnet armature including the armature region with a protective layer, introducing a non-cross linked elastomeric material into the armature region with using an adhesion promoter and cross-linking the elastomeric material by the action of pressure and heat to form the elastomeric sealing element. Similarly, a magnetic armature is provided manufactured according to foregoing preferred method.

In another aspect of the present invention the armature region includes an external boundary face having an undercut to interlockingly secure the elastomeric sealing element around the armature region.

In yet another aspect of the present invention the armature region includes a cavity region for receiving an elastomeric sealing element, the cavity region including a boundary face having an undercut to interlockingly secure the elastomeric sealing element within the cavity region.

Accordingly, an object of the present invention is to provide a method for manufacturing magnet armatures which permits the use of a complete coating of the magnet armature and an elastomeric sealing element.

Another object of the present invention is to provide a method for manufacturing a magnet armature which includes an elastomeric sealing element without introducing an adhesion promoter.

Another object of the present invention is to provide a method for manufacturing a magnet armature which includes an elastomeric insert in a cavity region of the magnet armature.

Another object of the present invention is to provide a method for manufacturing a magnet armature which includes an armature region for receiving an elastomeric sealing element, the armature region including an external boundary face having an undercut to interlockingly secure the elastomeric sealing element around the armature region.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

The usual form of magnet armatures known to those skilled in the art, together with their installation in a valve housing, will be explained on the basis of FIG. 4 of E2; the reference symbols therein are shown in braces here.

Magnet armature {39} is constructed as a cylindrical member with a cylindrical outer surface and two end boundary faces [face of the molding {42} and boundary face of {41 }]; it is made of ferromagnetic material. At one of the two end boundary faces, an elastomeric sealing element {41 } is disposed on this region of the armature.

The magnet armature is mounted displaceably under the load of a spring {40} in a valve housing, which is equipped with an actuating magnet [solenoid coil {38}]. When the energizing current of the actuating magnet is off, the magnet armature is caused by the action of the spring to occupy in the valve housing a first position or home position [positions {43}, {45} and {47} for the three illustrated valve types] and, when the energizing current of the actuating magnet is on, the magnet armature occupies a second position or actuation position [positions {44}, {46} and {48}].

At one of these two positions there is disposed in the valve housing at least a valve seat {31}; this is shown in the embodiment according to FIG. 4 therein in home positions {43} and {47} of the corresponding valve types [alternatively, a valve seat can also be disposed at the actuating position in the valve housing]. In these valve types, one of the two positions [in this case the home position] represents a hermetically sealing position; in position {45}, the corresponding valve does not have a hermetically sealing position, and so the use of a valve seat is unnecessary.

Figure 1A:
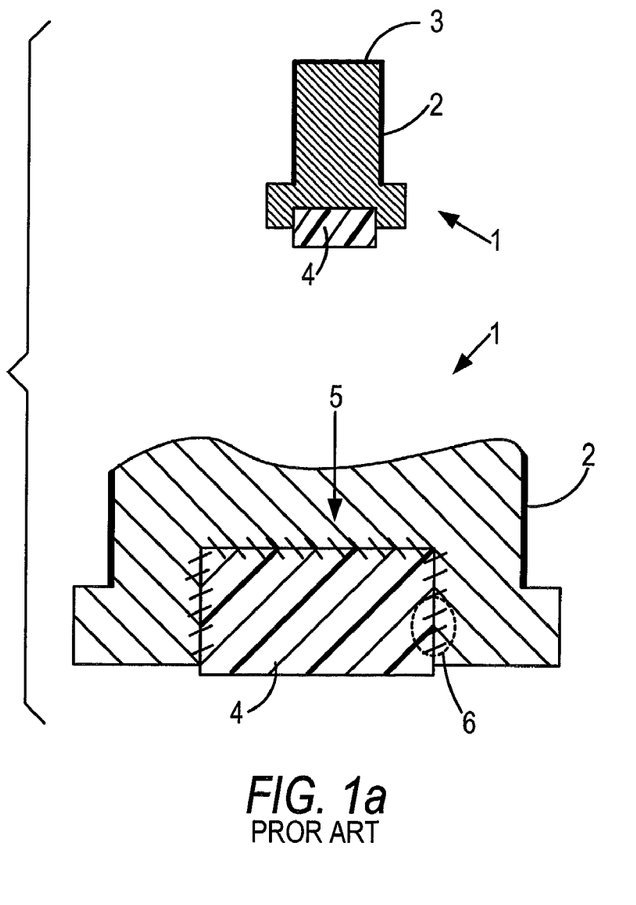
FIGS. 1a and 1b show a comparison of a magnet armature manufactured using known or conventional techniques with a magnet armature manufactured according to a preferred embodiment of the present invention.

Referring now to FIG. 1a, a magnetic armature is shown having an elastomeric sealing element disposed in the form of an elastomeric insert 4 in a corresponding elastomer cavity 5 in the magnet armature, which is facing the valve seat, so that the valve seat forms a pressure-tight closure with the elastomeric sealing element when this position is occupied.

At the boundary faces relative to the elastomeric cavity in the magnet armature, the elastomeric sealing element, namely the elastomeric insert, is bonded thereto via an elastomer-to-metal bond 6, otherwise known as a rubber-to-metal bond. This magnet armature of the type described in the foregoing is referred to hereinafter as the "EBS/prior art" armature type, which is represented by reference symbol 1, where it is shown in the top part of the drawing as a complete part and in the bottom part of the drawing as an enlarged detail with the elastomeric sealing element constructed as elastomeric insert 4.

As already explained hereinabove, the elastomer-to-metal bond requires an adhesion promoter, which is effective only on a very carefully cleaned and pure metal surface, and it precludes the use of a coating such as proposed in E1. For this reason, the "EBS/prior art" armature type, as explained hereinafter, is also coated only partly, with the result that at least the armature region around the elastomeric insert is not coated.

The advantage of a plastic coating lies in the fact among others that, in principle, corrosion protection can also be imparted therewith. It is precisely for applications in automotive engineering that corrosion protection is absolutely necessary, because of the environmental conditions encountered in that art. As already explained, however, corrosion protection for this armature type cannot be achieved by complete coating, and so corrosion protection must be provided by other means.

In the "EBS/prior art" armature type, corrosion protection is achieved by choosing a "stainless steel alloy." Such steel types have three major disadvantages compared with normal mild steel [such as structural steel St 37]: firstly, they are very expensive, secondly, they are difficult to machine, because of their high Cr content among other reasons, and thirdly, they do not have optimal magnetic properties. Because of these poor magnetic properties, the physical size of the overall solenoid valve must be enlarged, whereby the mass is increased and the resulting larger inertial forces then also prevent short valve operating times.

In the "EBS/prior art" armature type 1 corresponding to FIG. 1a, the region of outer surface 2 and end face 3 of the magnet armature disposed opposite the elastomeric insert 4 are provided with a protective plastic coat in the manner of E1, preferably with a PTFE material [polytetrafluoroethylene, trademarked as "Teflon", for example] in a thickness of 12 µm ±5 µm, for example. This partial coating ensures that the magnet armature will have adequate fatigue strength for EBS applications.

The fatigue strength requirement results from the large number of valve actuations for EBS braking actions and the nature of the wear phenomena involved. For a vehicle life of 20 years, the armature must withstand on the order of 40 million operating cycles with only minor deformation.

Figure 2:
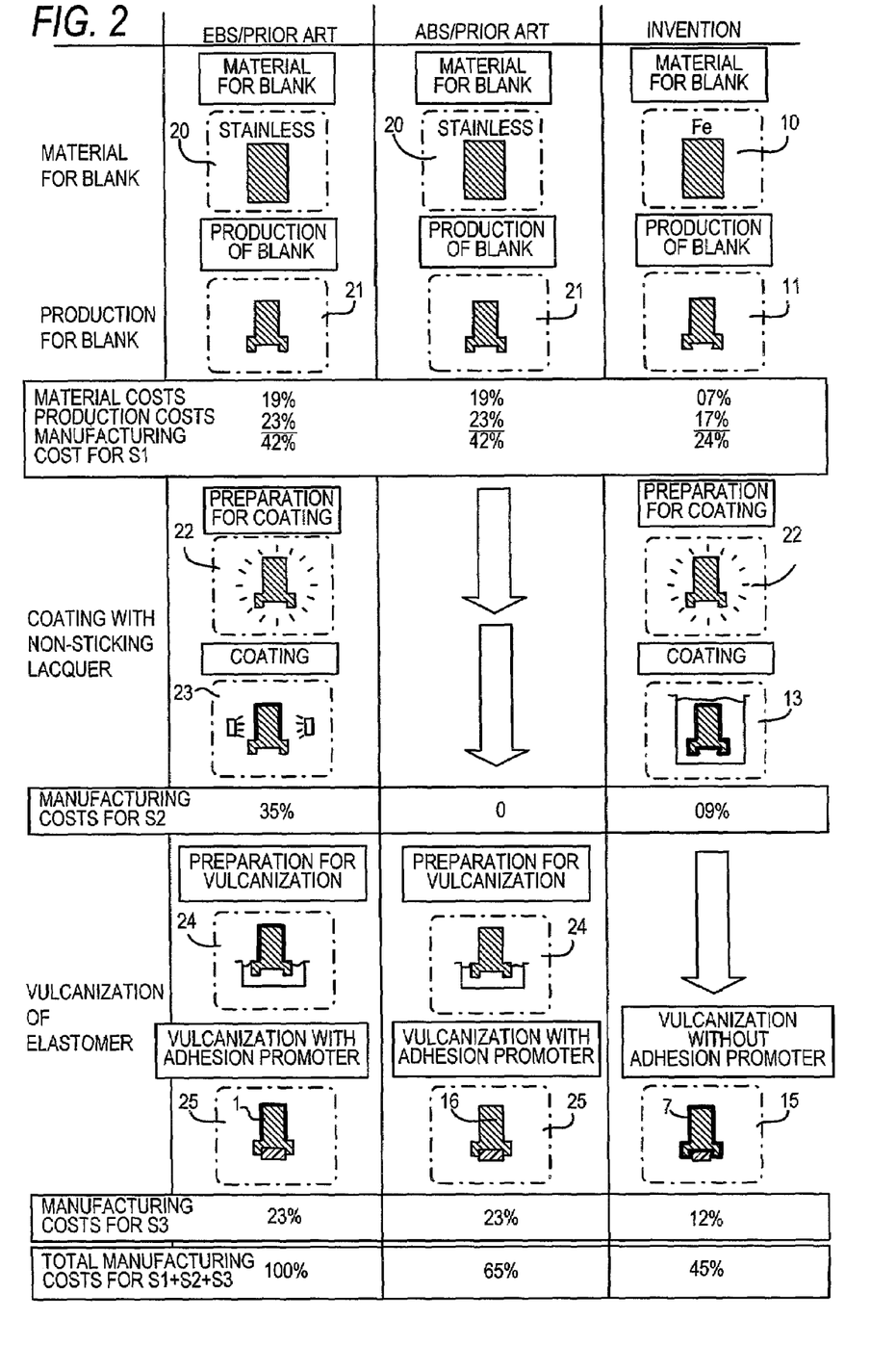
FIG. 2 shows the method for production of conventional magnet armatures with its manufacturing costs in comparison with the manufacturing costs of a magnet armature manufactured according to the preferred embodiment of the present invention.

As explained in E1, two regions in particular are important for the fatigue strength of the magnet armature. The first region is lateral outer surface 2 of the magnet armature. As shown in FIG. 2 of E1, inside the valve housing the magnet armature is mounted in an armature guide tube, against which it is supported on one side during operation. Because of friction of the armature, it rubs during its movement against the armature guide tube causing wear along the line of contact and ultimately, if no further measures are provided, leading to destruction of the armature guide tube. By coating the armature on its outer surface, it is possible to reduce the friction of the armature against the armature guide tube sufficiently that the guide tube is no longer destroyed by the rubbing movements during operation.

As also described in E1, the other region represents the end face which is disposed opposite the elastomeric insert, and which is caused by spring force to strike the metal stop upon return to home position, whereby the impact face of the armature suffers flattening with time, possibly even leading to a mushroom-like structure, as is the case for a chisel beaten with a hammer. The danger of destruction of the stop region is prevented by coating this end face.

In FIG. 2 of the present application, the manufacturing costs for the "EBS/prior art" armature type are presented in the second column from the left. Additionally, FIG. 2 shows the manufacturing costs for the "ABS/prior art" in the third column from the left and for the present invention in the last column from the left. For this purpose, the manufacturing costs valid at the time when the patent application was filed are shown for the individual production steps (S1 through S3) as a fraction of the total manufacturing costs for the armature type, such that the total manufacturing costs for the armature type correspond and add up to 100% for the individual production steps.

In a first production step S1, the magnet armature is made in its intended shape, including the armature region for the elastomeric sealing element. The manufacturing costs of first production step S1 represent a considerable fraction, equal to 42% of the total manufacturing costs. This is due on the one hand to the fact that the material costs for the blank 20 of corrosion-resistant but ferromagnetic base material [the material for the blank is designated "stainless"] are considerable, corresponding to 19%, for the reasons explained hereinabove, and on the other hand to the fact that the production costs for mechanical machining of this material are very high, corresponding to 23%, because of the difficult machinability explained hereinabove [small chip volume, frequent tool changes].

This cost estimate is based on the assumption that a chip-removing technique will be used for blank production 21. It should be noted that the blank can also be made by chipless techniques, such as the cold-extrusion process. The manufacturing costs for an individual part are then much lower, although the tool costs are very high, meaning that this process is suitable only for very large production runs. Furthermore, the poor machinability compared with other materials is also a problem here.

In a second production step S2, the magnet armature is partly coated, as explained hereinabove, on its outer surface and on the end face disposed opposite the elastomeric sealing element. Since this process of coating with non-sticking lacquer is normally performed by a manufacturer other than that which produces the blank, the parts are shipped by the blank manufacturer to the coating manufacturer, which must first clean the parts very carefully in preparation for coating, since they have usually been contaminated during production.

Coating with the plastic film must take place extremely carefully, since only the lateral outer surface and the cited end face are permitted to be coated for the "EBS/prior art." Under all circumstances, it must be ensured that plastic does not enter the region of the cavity for the elastomeric sealing element, since otherwise, as explained hereinabove, subsequent formation of a secure elastomer-to-metal bond by means of vulcanization is not possible.

For this reason, as illustrated in simplified form in FIG. 2, a coating method, such as coating by spraying from nozzles, is used which permits partial coating. The cleaned blanks are sorted as individual parts in a holder and are provided with a layer of plastic in the nozzle-coating process. The plastic material is sprayed via one or more nozzles, the workpiece and nozzle being moved relative to one another in such a way that only those surface regions which must be coated are sprayed, while the other surface regions remain bare. It is because of this complex coating process that the relatively high manufacturing costs of 35% are incurred for production step S2 in coating with non-sticking lacquer. The coating process is followed by a heat treatment; this is identical for such coating methods and is described hereinafter for the inventive production method.

For all of the production methods shown in FIG. 2, an elastomeric sealing element is made from elastomeric material or thermoplastic elastomeric material. An elastomer is to be understood as an elastic polymer [rubber], or in other words an organochemical compound or a blend of organochemical compounds obtained by polymerization of individual structure units [monomers]. Such a polymer can be a natural polymer, such as natural rubber [polymer designation NR], or it can be obtained as a synthetic polymer by chemical polymerization.

Particularly suitable materials for use as the elastomeric sealing element are "acrylonitrile butadiene rubber" a synthetic polymer with the polymer designation NBR, under certain circumstances this polymer in hydrogenated form [polymer designation HNBR], or fluorinated rubber [polymer designation FKM, "Viton" (trademark of the du Pont Co.)] or others. A suitable mixture, mainly on the basis of the cited polymers, is composed to achieve desired properties such as elasticity, coefficient of friction and temperature range. Thermoplastic elastomers are also suitable, especially those based on polyurethane [TPU].

As the word "polymer" suggests, this material has very long molecular chains, which constitute the basis of elasticity. Elastomers in non-cross-linked condition exist as compounds which acquire doughy consistency at elevated temperatures and which do not yet have the desired elasticity and extensibility.

Natural rubber is the dried latex in which the molecular chains have not yet been chemically cross-linked with one another. The elastomeric mixture is formed from this by blending with several other chemicals, including carbon black and sulfur, for example. It is only by vulcanization, a process which involves heat and pressure, that the actual elastic natural-rubber elastomer is obtained from the elastomeric mixture. The vulcanization process can be thought of as cross-linking of the long molecular chains, whereby the molecular-chain strands become chemically bonded to one another at cross-linking points. The molecular chains cross-linked in this way work together under mechanical load, thus imparting to the natural rubber the reversible extensibility that is the basis of elasticity.

Synthetic rubber also has the form initially of a doughy material which is not yet elastic following polymerization, but which acquires its elastic properties due to cross-linking of its molecular chains after it has been mixed with several other chemicals and subjected to vulcanization as the pressure and heat treatment. Examples of substances other than sulfur that can be used for vulcanization of synthetic polymers are peroxides or even other substances specially suitable for these polymers.

Thermoplastic elastomers do not undergo chemical cross-linking of the molecular chains, but these chains become so strongly bonded with one another by physical interactions that an elastic material is obtained. Upon heating, the materials acquire a plastic state in which they can be shaped, but during subsequent cooling they revert to the elastic condition.

As explained, preferably the synthetic polymers mentioned hereinabove are used for making an elastomeric sealing element for a magnet armature, and they are vulcanized with the cross-linking agents suitable for them in the temperature/pressure treatment, or in the case of thermoplastic elastomers are processed under heating.

Referring further to FIG. 1a, for the "EBS/prior art" armature type 1, the mixture for elastomeric insert 4, which initially is not yet cross-linked, is introduced into elastomer cavity 5. During cross-linking of the elastomer in the temperature/pressure treatment [or upon cooling of the thermoplastic elastomer], a strongly adhering nonpositive elastomer-to-metal bond is simultaneously formed between elastomeric insert 4 and the bottom and side faces of elastomer cavity 5 in magnet armature 1; this is produced by the action, between the boundary of elastomeric insert 4 and the metal surface of elastomer cavity 5, of the adhesion promoter already mentioned hereinabove, mutual "interpenetration" of the two boundary faces being indicated with reference symbol 6. The action of the adhesion promoter can be imagined to result on the one hand from its good adhesion to the metal, by the fact that intermolecular Van der Waals forces act within the interfacial layer, and on the other hand from its good adhesion to the elastomer.

As an alternative to this single-film interfacial layer, an embodiment is also possible with a double-film interfacial layer, in which the metal surface is first covered with a securely adhering primer cement with a thickness of, for example, 20 μm, on which elastomeric insert 4 coated with the adhesion promoter is then formed.

Either of the foregoing alternatives are performed as part of the vulcanization process shown as step S3 for the "EBS/prior art" armature type in FIG. 2. Depending on which of the known methods is used to obtain the elastomer-to-metal bond, the fatigue strength thereof is contingent upon careful and reproducible performance of the temperature/pressure treatment of vulcanization with adhesion promoter 25 [or cooling of the thermoplastic elastomer], including the very careful preparation for vulcanization 24.

Referring further to FIG. 2, the third production step S3 of elastomer vulcanization is usually performed by a supplier other than that which performed the coating process S2, since the technology requirements for this purpose are very different. The parts coated according to process step 23 are usually shipped to the vulcanization company and are contaminated at the boundary faces of elastomer cavity 5.

During preparation for vulcanization 24, careful degreasing is performed at first, and if necessary is followed by plasma cleaning to remove every type of contamination and bring about a highly active surface condition of the metal. Adhesion can also be improved by increasing the effective metal surface area, for example by sandblasting with abrasive powder. Finally, the metal surface is also altered chemically if necessary, for example by phosphating or chromating.

Thus preparation for vulcanization 24 represents a considerable portion, equal to 25%, of the total manufacturing costs in third production step S3. Partial step 25 of vulcanization with the adhesion promoter [or of cooling of the thermoplastic elastomer], which is responsible for the remainder of these manufacturing costs, is preferably performed by the transfer process explained hereinafter.

It is important that the necessary dimensional accuracy for the distance from the smooth elastomer surface of elastomeric insert 4 directed toward the sealing seat to magnet armature 1 be ensured during execution of the shaping process [vulcanization in the case of the elastomer or injection-molding in the case of the thermoplastic elastomer]. Thus two things are achieved by shaping process 25, namely adhesion of elastomeric insert 4 to magnet armature 1 and dimensional accuracy of elastomeric insert 4 for the valve function.

In the production process according to a preferred embodiment of the present invention corresponding to the fourth column from the left in FIG. 2, the total manufacturing costs for production steps S1 through S3 are reduced to 45%. Specifically, the manufacturing costs are lowered from 42% to 24% in first production step S1, from 35% to 9% in second production step S2, and from 23% to 12% in third production step S3.

As regards first production step S1, the savings correspond to a reduction of material costs from 19% to 7% and a reduction of production costs from 23% to 17%. As explained hereinabove, corrosion protection is achieved by complete coating of the magnet armature, and so an inexpensive base material [designated "Fe" for raw material (10)] can be chosen. Furthermore, in choosing a suitable ferrous material, the emphasis can be placed on very good magnetic properties, since a large number of appropriate materials falls into this category. The production costs for blank production 11 are reduced because such a ferrous material can be machined much more easily.

For second production step S2 or coating with non-sticking lacquer, cleaning preparations correspond approximately to those for the "EBS/prior art" armature type 22. The considerable reduction of manufacturing costs from 35% to 9% in the method according the present invention is achieved by the much simpler type of coating. Indeed, a mass-production process can be employed using the inventive method. FIG. 2 shows, in a simplified diagram for coating process 13, an immersion technique in which all parts to be coated are lowered together into an immersion bath without the need for sorting and without the requirement that parts of the surface must remain bare. The coating process is completed by this simple immersion treatment. This great simplification compared with the coating process for the "EBS/prior art" armature type explains the reduction of manufacturing costs in second production step S2.

It must also be pointed out that the heat treatment already mentioned hereinabove is performed directly after immersion for the magnet armature, thus ensuring that the PTFE coat dries, that good adhesion to the metal surface is achieved and that the desired non-sticking properties are obtained on the free surface of the PTFE coat.

As an alternative to the immersion technique, coating process 13 can also be performed with an alternative mass-production technique, including the tumbling technique. The magnet armatures to be coated are placed in a revolving drum and covered over their entire surface with pulverulent coating material, which becomes consolidated to some extent on the surface by this process. Thereafter the magnet armatures coated in this way are also subjected to the heat treatment as explained hereinabove.

Figure 1B:
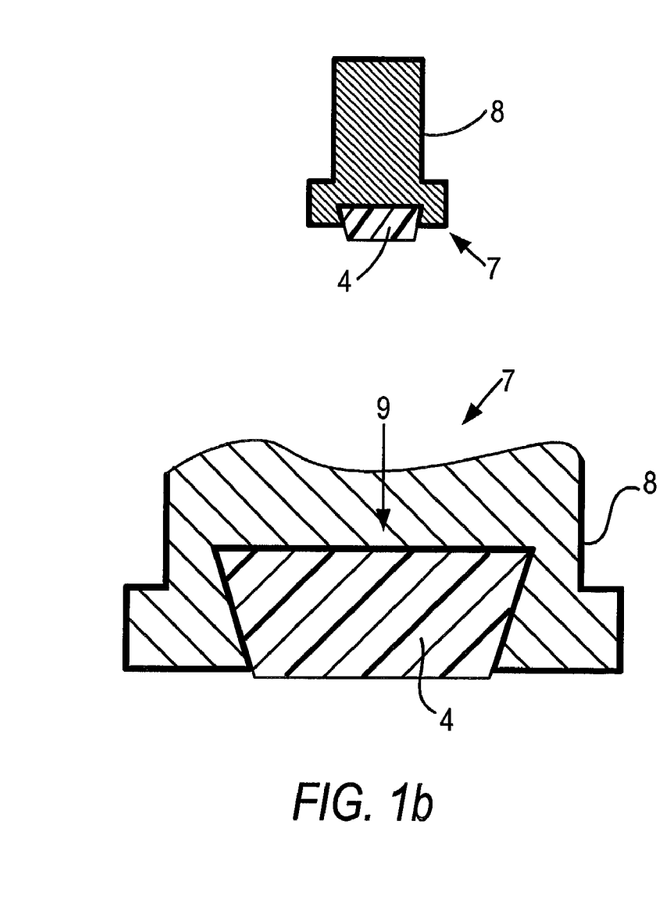

Referring to the magnet armature shown in FIG. 1b, and production step S3 shown in FIG. 2, the adhesion of the elastomeric insert 4 is no longer achieved by a nonpositive elastomer-to-metal bond as in the prior art, but is created by an interlocking arrangement, which in FIGS. 1b and 2 have the form of an undercut. For this purpose, the lateral boundary face of elastomer cavity 9 is formed as an inclined section. Since the word "undercut" is used somewhat loosely in colloquial expressions, it must be explained that, within the meaning of the present invention, undercutting of a bore [of a hole] exists in the most general sense when a hypothetical rigid filling of this bore [of this hole] is secured interlockingly. This secured relationship is achieved by the fact that, in the presence of a force $F_1$ acting on the filling in the direction of the [an] open end of the bore [of the hole], forces develop with components that counteract the aforesaid force $F_1$, even if forces of friction and adhesion are hypothetically completely absent between the bore wall [hole wall] and the filling.

The action of an adhesion promoter is therefore not needed during vulcanization. The use of an adhesion promoter would be ineffective in any case, since it is not possible to create an adhesive bond to elastomeric insert 4 on the PTFE surface of the coating. Thus the working cycle of preparation for vulcanization that is standard in the prior art is unnecessary. Since adhesion does not have to be established, slight contamination is acceptable in this method, and so the cleaning process may be unnecessary under the appropriate circumstances.

An elastomer-to-metal bond can be made by the three shaping processes based on the compression technique, on the transfer technique and on the injection technique. What is particularly suitable for the inventive production method is the transfer technique, in which magnet armature 7 is clamped in a mold and then the polymer to be cross-linked is forced into the empty space of elastomer cavity 9 via a female die. For this purpose the polymer is placed in the machine above the orifice of the female die, after which an extrusion plunger exerts pressure on the polymer, causing it to flow through the orifice of the female die into the empty space of the elastomer cavity 9. Depending on the type of polymer to be processed, a pressure of normally 200 to 250 bar is generated in this extrusion process, the mold being preheated to a temperature of 170 to 200° C. The time for performing this shaping process [vulcanization in the case of the elastomer or injection in the case of the thermoplastic elastomer] ranges between 1 and 2 minutes depending on boundary conditions.

As explained hereinabove, the dimensional accuracy that elastomeric insert 4 according to FIG. 1b needs for the valve function is ensured in this transfer process. Such dimensional accuracy means on the one hand that the surface of elastomeric insert 4 directed toward the valve seat has appropriately even and smooth structure in the region of the bearing faces of the valve seat, as is ensured by a smooth surface of the mold, and on the other hand that, as explained hereinabove, the size of the distance from this surface to magnet armature 7 is equal to the required distance necessary for the valve function.

As shown in FIG. 2, for simplified vulcanization without an adhesion promoter, the manufacturing costs for third production step S3 decrease from 23% in the case of the "EBS/prior art" armature type, where partial steps 24 and 25 are necessary, to 12% in the case of inventive magnet armature 7, where only vulcanization without the use of adhesion promoter is necessary.

The third column from the left in FIG. 2 illustrates the production process for "ABS/prior art" armature type 16. This armature type represents a known armature for ABS/ASR brake-pressure modulators.

For such a magnet armature, the functional requirements are entirely analogous to those of the "EBS/prior art" armature type. In any case, corrosion protection is also necessary here, whereby a "stainless steel alloy" 20 is also chosen for the "ABS/prior art" armature type; consequently the cost structure here is also the same as for the "EBS/prior art" armature type, with manufacturing costs of 42% for first production step S1.

Since fatigue strength is not a requirement for the "ABS/prior art" armature type, the situation for this ABS type is simpler than that for the "EBS/prior art" armature type. Since only a very small proportion of all braking actions are ABS actions, fewer than 1 million operating cycles of the armature are anticipated over the vehicle life of 20 years; all other braking actions are performed by the conventional operating brake system, without participation of the ABS solenoid control valves. The number of operating cycles of a magnet armature in the case of ABS armatures in conventional braking systems is therefore drastically reduced compared with EBS armatures. In view of the resulting smaller number of actuations, the fatigue-strength requirements for the magnet armature are also drastically reduced, and so, in turn, as shown in FIG. 2, a coating of non-sticking lacquer is not provided for this armature type. It should also be pointed out that the ASR operating cycles are also included in the foregoing estimate.

Third production step S3, in which the elastomer-to-metal bond is established by elastomer vulcanization (25), once again corresponds to that of the "EBS/prior art" armature type, and so the same manufacturing costs of 23% are expended here.

Thus the total manufacturing costs for the "ABS/prior art" armature type amount to 65%. As such, these manufacturing costs are considerably higher than the manufacturing costs of 45% in the inventive production method. The inventive manufacturing method therefore enjoys the additional advantage that it also represents a lower-cost method for manufacturing ABS magnet armatures. With the inventive method, therefore, it is now necessary to manufacture only one armature type, which can be used both for EBS and for ABS applications. The use of only one armature type leads to simplified and thus lower-cost arrangements in production planning, it reduces warehousing and in particular it lowers the manufacturing costs beyond the extent indicated in FIG. 2 by virtue of the fact that much larger production runs are possible, which are not illustrated in the percentage cost breakdown.

Figure 3:
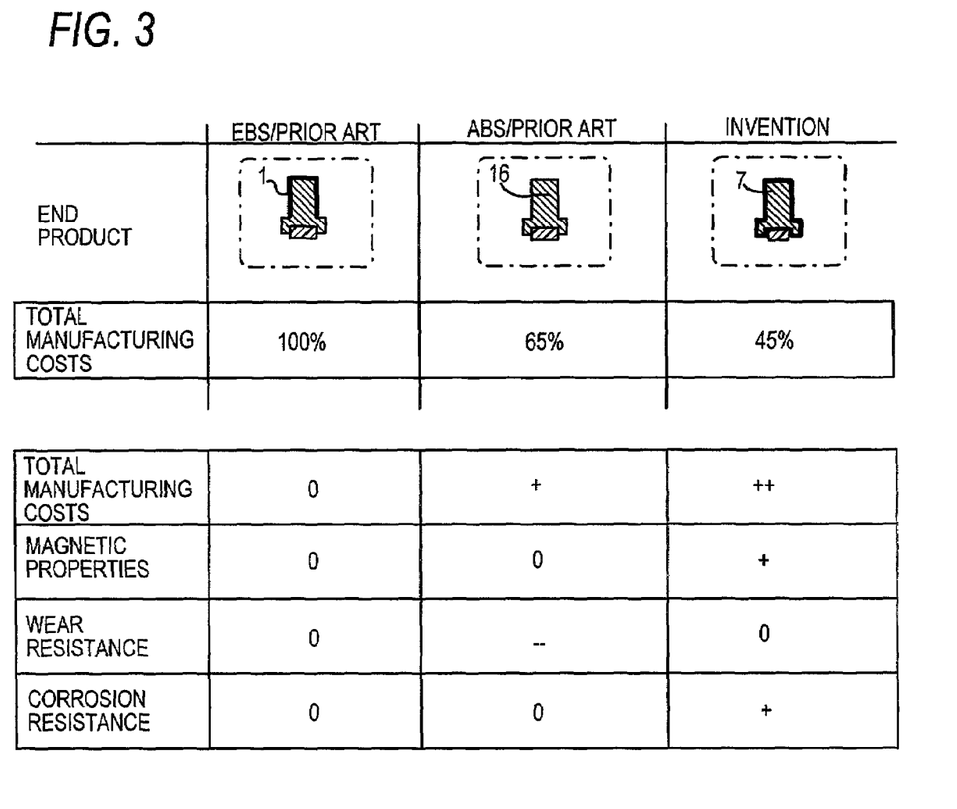
FIG. 3 shows an assessment of the properties of conventional magnet armatures in comparison with the properties of the magnet armature manufactured according to the inventive method.

FIG. 3 shows, in the form of a list, the assessments of the properties of the two conventional magnet armatures explained hereinabove and those of the magnet armature manufactured by the inventive method. As the reference value, shown in the second column from the left, there is used "EBS/prior art" magnet armature 1, for which "0" is therefore entered in all columns corresponding to total manufacturing costs, magnetic properties, wear resistance and corrosion resistance. The assessments of the properties of the "ABS/prior art"armature 16 are entered in the third column from the left, while the assessments of the properties of the inventive magnet armature are entered in the fourth column from the left.

The manufacturing costs of the "ABS/prior art" armature type 16 are lower in relative terms, and so "+" is entered in the column. Of course, this does not represent an improvement in the real sense, because this cost reduction is due merely to the fact that coating is not necessary here. Compared with the reference armature, the manufacturing costs of inventive magnet armature 7 are much lower, permitting an assessment of "++".

The magnetic properties of the "ABS/prior art" armature type 16 are identical to those of the reference armature. As already mentioned hereinabove, the magnetic properties and corrosion resistance of a steel alloy generally vary in opposite directions [in many cases an improvement in magnetic properties adversely influences the corrosion resistance and vice versa], and so, when choosing materials, a compromise must be sought between adequate magnetic properties and corrosion resistance that is still acceptable. For inventive magnet armature 7, on the other hand, no consideration need be given to corrosion resistance when choosing materials, and the choice can be based on the good magnetic properties of ferrous alloy. The magnetic properties for this magnet armature are therefore assessed as "+".

As regards wear resistance, the "EBS/prior art" magnet armature 1 and inventive magnet armature 7 can be assessed as equivalent, since both armature types are coated on the faces that are critical for wear; in contrast, the "ABS/prior art" magnet armature 16 is not provided with a coating and exhibits only poor wear resistance, and so "−−" is entered in the assessment.

For corrosion resistance, inventive magnet armature 7 is assessed as "+" compared with the other two types; for this magnet armature, corrosion resistance is ensured by the all-around coating, whereas the other two magnet armatures 1 and 16 are not "completely" protected against corrosion, because of the compromise explained hereinabove between the corrosion resistance and magnetic properties of an alloy for magnet armatures. For these versions the risk still exists, in the presence of certain adverse environmental influences, for example, that a "rust film" will form on their surface.

Besides the explained embodiment in which the elastomeric sealing element is formed as an elastomeric insert and an elastomer cavity with internal lateral boundary faces is provided for this elastomer insert in an armature region of the magnet armature, the possibility also exists of constructing the elastomeric sealing element as an elastomeric cap. In this alternative embodiment, as shown in the topmost diagram of FIG. 4b, armature region 18 is constructed as a cylindrical part with external lateral boundary faces, around which elastomeric cap 17 is injected during vulcanization.

It is pointed out that this represents a solution with higher technical quality than that of the known method of snapping a prefabricated elastomeric cap in place on a cylindrical part merely by mechanical action. In the case of a snap-on elastomeric cap, dimensional accuracy of the sealing face is not adequately ensured. In contrast, as explained hereinabove, dimensional accuracy of the free elastomer surface acting as the sealing face is guaranteed during the vulcanization process, and the valve function is therefore assured.

Figures 4A, 4B:
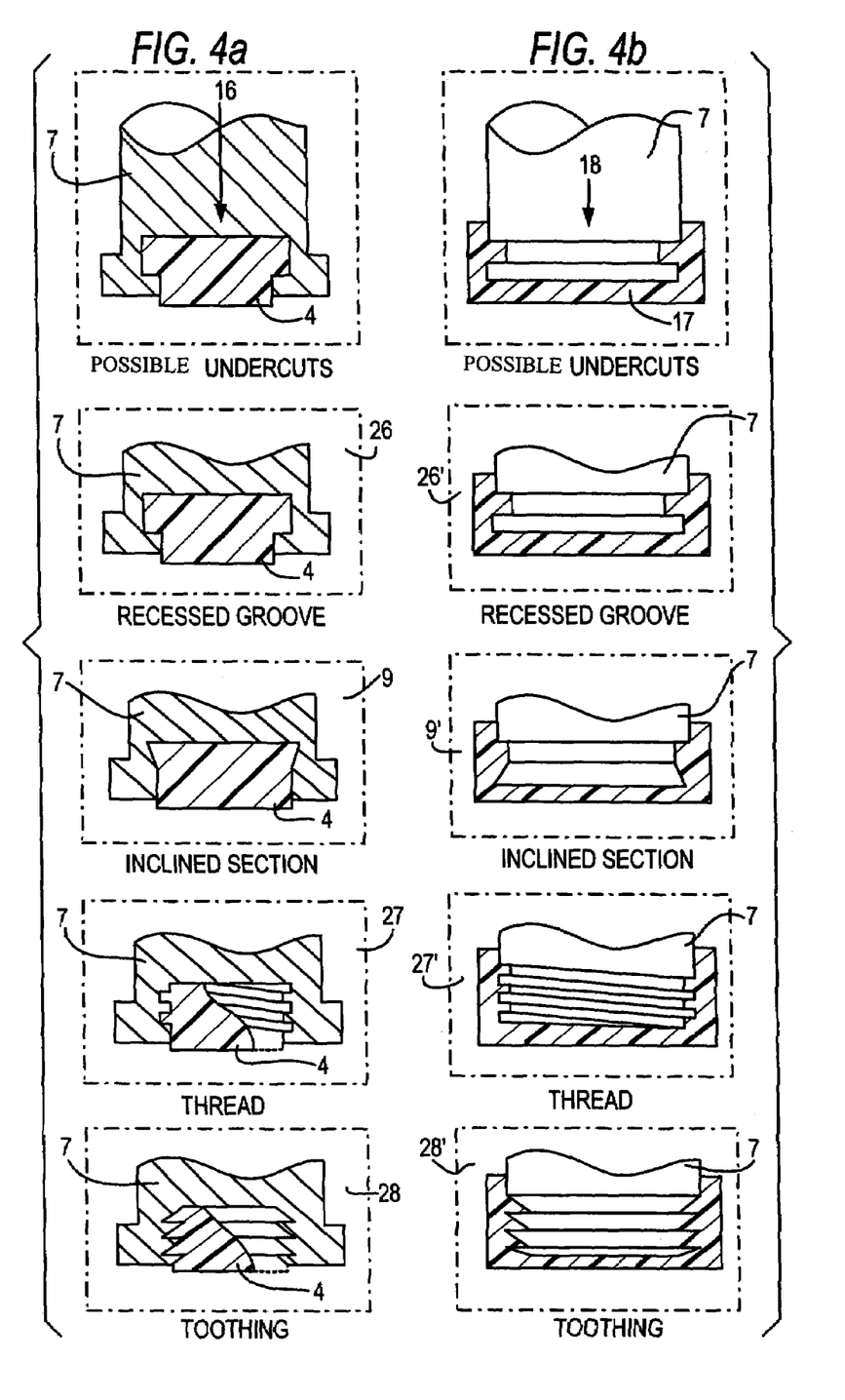
FIG. 4a shows embodiments of undercuts in an elastomeric sealing element designed as the elastomeric insert.
FIG. 4b shows embodiments of undercuts in an elastomeric sealing element designed as the elastomeric sealing cap.

The top diagram of FIG. 4a shows the inventive magnet armature in its embodiment explained in the introduction, together with elastomer cavity 16 with its lateral internal boundary faces.

Possible embodiments of undercuts are illustrated in the lower diagrams of FIG. 4a and FIG. 4b.

Embodiment 9 shows the undercut as an inclined section in a portion of the lateral boundary face of elastomer cavity 16. Embodiment 9' shows a similar form of the undercut in a portion of the lateral boundary face of cylindrical part 18.

Embodiments 26 and 26' show undercuts which have the form of a recessed groove in the respective lateral boundary face. Naturally a plurality of recessed grooves instead of one recessed grove can also be provided in these cases.

Embodiments 27 and 27' show the undercut in the form of a threaded segment in a portion of the respective lateral boundary faces; naturally this can also be provided in a plurality of portions of the lateral boundary faces.

Embodiments 28 and 28' show the undercut in the form of a toothing which, by analogy with the foregoing embodiments, can be provided in one or more portions of the lateral boundary faces.

Figure 5:
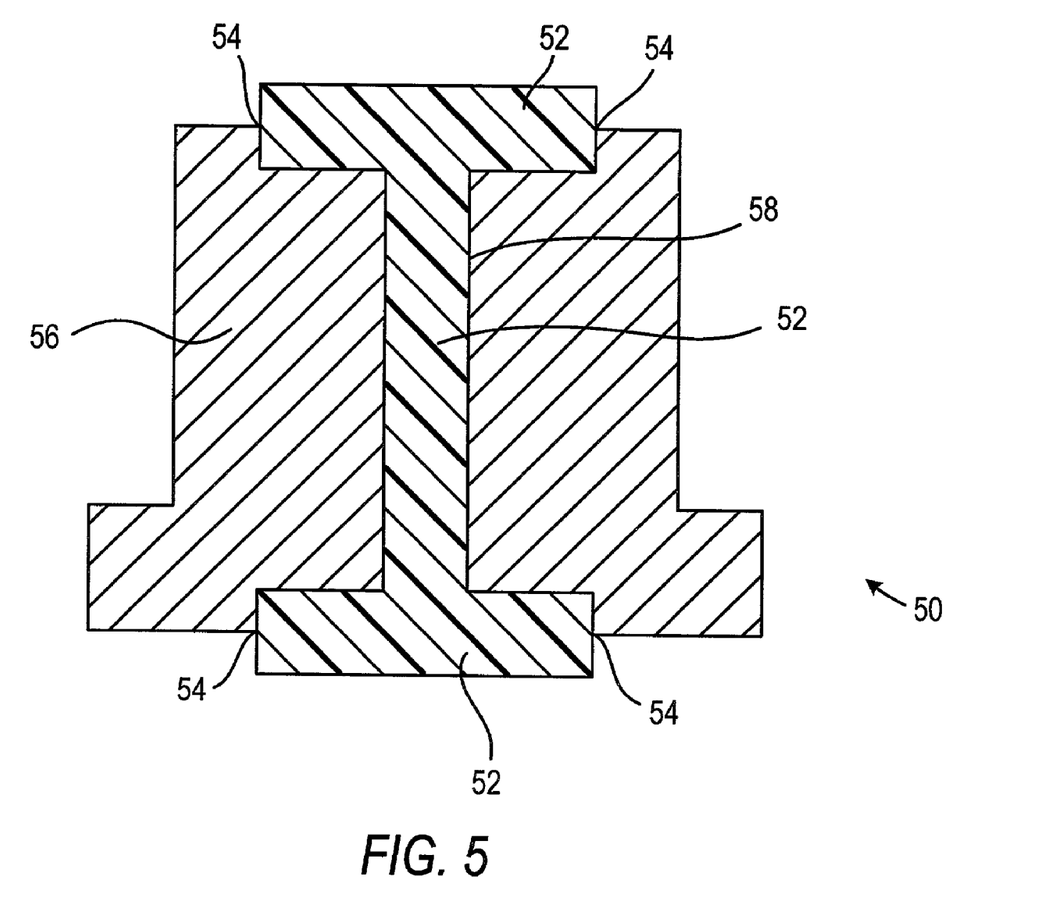
FIG. 5 shows an alternative embodiment of an armature having elastomeric sealing elements provided at two external regions of the armature without using an undercut.

Besides the explained embodiment with an elastomeric sealing element in just one armature region of the magnet armature, in the alternative embodiment generally shown as 50 in FIG. 5, elastomeric sealing elements 52 together forming an I-beam shaped construction [in the form of elastomeric inserts or as elastomeric caps] can also be provided at two external armature regions 54, 54 of the cylindrical part of the armature 56. Hermetically sealing valve seats are then provided in the valve for both armature positions of such a magnet armature.

In such a magnet armature, the two elastomeric sealing elements are advantageously joined to one another via a channel 58 in the interior of the magnet armature. This channel is also filled with elastomer during shaping, so that an interlocking structure is obtained and the need for an undercut can be eliminated in this embodiment. In this version also, the armature 56 can be coated with non-sticking lacquer beforehand over the entire surface.

Accordingly, an improved method is provided for manufacturing a magnetic armature having the advantage that the process is simplified and the total manufacturing costs are much lower than those of prior art methods. Magnet armatures of this type are constructed as cylindrical members and are usually provided in the region of one of the two end faces with an elastomeric sealing element, which according to the prior art is bonded to the magnet armature by vulcanization, an adhesive elastomer-to-metal bond being formed between the magnet armature and the elastomeric sealing element during vulcanization. Since bonds of this type are not possible for a completely coated magnet armature, the elastomer for the elastomeric sealing element is, according to the invention, vulcanized onto the armature without using an adhesion promoter. The resulting absence of nonpositive bonding between the elastomeric sealing element and the magnet armature is replaced by the structural feature of an interlocking relationship between the magnet armature and the elastomer. The interlocking relationship is achieved by an undercut in the magnet armature.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for manufacturing a magnet armature constructed from ferromagnetic material as a cylindrical member with one outer surface and two end boundary faces and at least one elastomeric sealing element disposed on at least one of the two end regions of the armature, the armature being mounted displaceably under the load of a spring in a valve housing equipped with an actuating magnet, wherein the magnet armature occupies a first position or home position when the energizing current of the actuating magnet is off, and occupies a second or actuation position when the energizing current of the actuating magnet is on, and wherein, in valves having at least one hermetically sealing position in at least one of the two positions, there is disposed in the valve housing a valve seat, which when this position is occupied by the magnet armature forms a pressure-tight closure via the at least one elastomeric sealing element, the method comprising the steps of manufacturing the magnet armature in its intended shape, including an armature region for the at least one elastomeric sealing element, coating the magnet armature with a plastic layer on its entire surface, introducing a non-cross-linked elastomeric material into the armature region for the elastomeric sealing element without using an adhesion promoter, and cross-linking the introduced elastomeric material by the action of pressure and heat to vulcanize the elastomeric material and form the at least one elastomeric sealing element in the armature region.

2. The manufacturing method according to claim 1, wherein non-cross-linked elastomeric material is introduced into the armature region without previous separate cleaning.

3. A magnet-armature device manufactured according to the method of claim 1, wherein an interlocking relationship is established between the at least one elastomeric sealing element and the armature region.

4. The manufacturing method according to claim 1, wherein an interlocking relationship is established between the at least one elastomeric sealing element and the armature region.

5. A magnet-armature device manufactured according to the method of claim 4, further comprising the step of providing an undercut in the armature region provided for the sealing element to achieve the interlocking relationship.

6. The manufacturing method according to claim 4, further comprising the step of providing an undercut in the armature region provided for the sealing element to achieve the interlocking relationship.

7. A magnet-armature device manufactured according to the method of claim 6, further comprising the steps of forming the elastomeric sealing element as an elastomeric insert and the armature region as an elastomer cavity with internal lateral boundary faces.

8. The manufacturing method according to claim 6, further comprising the steps of forming the elastomeric sealing element as an elastomeric insert and the armature region as an elastomer cavity with internal lateral boundary faces.

9. A magnet-armature device manufactured according to the method of claim 8, wherein the undercut is formed in the lateral boundary faces of the elastomer cavity.

10. The manufacturing method according to claim 8, wherein the undercut is formed in the lateral boundary faces of the elastomer cavity.

11. A magnet-armature device manufactured according to the method of claim 6, further comprising the steps of forming the armature region with external lateral boundary faces and the elastomeric sealing element as an elastomeric cap injection-molded around the external lateral boundary faces.

12. The manufacturing method according to claim 6, further comprising the steps of forming the armature region with external lateral boundary faces and the elastomeric sealing element as an elastomeric cap injection-molded around the external lateral boundary faces.

13. A magnet-armature device manufactured according to the method of claim 11, wherein the undercut is formed in the external lateral boundary faces of the armature region.

14. The manufacturing method according to claim 11, wherein the undercut is formed in the external lateral boundary faces of the armature region.

15. A magnet-armature device manufactured according to the method of claim 10, further comprising the step of forming the undercut by making the external lateral boundary face an inclined section in at least one portion.

16. The manufacturing method according to claim 10, further comprising the step of forming the undercut by making the external lateral boundary face an inclined section in at least one portion.

17. A magnet-armature device manufactured according to the method of claim 14, further comprising the step of forming the undercut by making the external lateral boundary face an inclined section in at least one portion.

18. The manufacturing method according to claim 14, further comprising the step of forming the undercut by making the external lateral boundary face an inclined section in at least one portion.

19. A magnet-armature device manufactured according to the method of claim 6, wherein the undercut is formed by at least one recessed groove in the internal lateral boundary face.

20. The manufacturing method according to claim 6, wherein the undercut is formed by at least one recessed groove in the internal lateral boundary face.

21. A magnet-armature device manufactured according to the method of claim 14, wherein the undercut is formed by at least one recessed groove in the external lateral boundary face.

22. The manufacturing method according to claim 14, wherein the undercut is formed by at least one recessed groove in the internal lateral boundary face.

23. A magnet-armature device manufactured according to the method of claim 6, wherein the undercut is formed by making the internal lateral boundary face a threaded segment or toothing in at least one portion.

24. The manufacturing method according to claim 6, wherein the undercut is formed by making the internal lateral boundary face a threaded segment or toothing in at least one portion.

25. A magnet-armature device manufactured according to the method of claim 14, wherein the undercut is formed by making the internal lateral boundary face a threaded segment or toothing in at least one portion.

26. The manufacturing method according to claim 14, wherein the undercut is formed by making the external lateral boundary face a threaded segment or toothing in at least one portion.

27. A magnet-armature device manufactured according to the method of claim 4, wherein a thermoplastic elastomeric material is chosen for the elastomeric sealing element.

28. The manufacturing method according to claim 4, wherein a thermoplastic elastomeric material is chosen for the elastomeric sealing element.

29. A magnet-armature device manufactured according to the method of claim 6, wherein a thermoplastic elastomeric material is chosen for the elastomeric sealing element.

30. The manufacturing method according to claim 6, wherein a thermoplastic elastomeric material is chosen for the elastomeric sealing element.

31. A method for producing a magnet armature to be used in a valve mechanism for controlling an electronic braking system comprising the steps of manufacturing a magnet armature including an armature region for an elastomeric sealing element, coating an outer surface of the magnet armature including the armature region with a protective layer, introducing a non-cross linked elastomeric material in the armature region, and cross-linking the elastomeric material by the action of pressure and heat to form the elastomeric sealing element.

32. The manufacturing method according to claim 31, wherein the non-cross-linked elastomeric material is introduced in the armature region without introducing an adhesion promoter.

33. The manufacturing method according to claim 31, wherein an interlocking relationship is established between the at least one elastomeric sealing element and the armature region.

34. The manufacturing method according to claim 33, further comprising the step of providing an undercut in the armature region to achieve the interlocking relationship.

35. The manufacturing method according to claim 31, further comprising the steps of forming the elastomeric sealing element as an elastomeric insert and the armature region as an elastomer cavity with an internal boundary face.

36. The manufacturing method according to claim 35, further comprising the step of forming an undercut in the internal boundary face of the elastomer cavity.

37. The manufacturing method according to claim 31, further comprising the steps of forming the armature region with an external boundary face and forming the elastomeric sealing element as an elastomeric cap around the external boundary face.

38. The manufacturing method according to claim 37, wherein the elastomeric cap is formed using an injection-molding technique.

39. The manufacturing method according to claim 37, further comprising the step of forming an undercut in the external boundary face of the armature region.

40. The manufacturing method according to claim 31, wherein a thermoplastic elastomeric material is chosen for the elastomeric sealing element.

41. A method for producing a magnet armature to be used in a valve mechanism for controlling an electronic braking system comprising the steps of manufacturing a magnet armature including an armature region for receiving an elastomeric sealing element, the armature region including a boundary face coming in contact with the elastomeric sealing element and shaped to interlockingly secure the elastomeric sealing element to the armature region, coating an outer surface of the magnet armature including the armature region boundary face with a protective layer, introducing a non-cross linked elastomeric material to the armature region, and cross-linking the elastomeric material by the action of pressure and heat to form the elastomeric sealing element.

42. The manufacturing method according to claim 41, wherein the non-cross-linked elastomeric material is introduced into the armature region without introducing an adhesion promoter.

43. The manufacturing method according to claim 41, further comprising the step of providing an undercut in the armature region to achieve the interlocking relationship.

44. The manufacturing method according to claim 41, further comprising the steps of forming the elastomeric sealing element as an elastomeric insert and the armature region as an elastomer cavity with the boundary face within the elastomer cavity.

45. The manufacturing method according to claim 44, further comprising the step of forming an undercut in the boundary face of the elastomer cavity to interlockingly secure the elastomeric sealing element to the armature region.

46. The manufacturing method according to claim 41, further comprising the steps of forming the boundary face on an external surface of the armature region and forming the elastomeric sealing element as an elastomeric cap around the external boundary face.

47. The manufacturing method according to claim 46, wherein the elastomeric cap is formed using an injection-molding technique.

48. The manufacturing method according to claim 46, further comprising the step of forming an undercut in the external boundary face to interlockingly secure the elastomeric sealing element to the armature region.

49. The manufacturing method according to claim 41, wherein a thermoplastic elastomeric material is chosen for the elastomeric sealing element.

50. A method for producing a magnet armature to be used in a valve mechanism for controlling an electronic braking system comprising the steps of manufacturing a magnet armature including an armature region for receiving an elastomeric sealing element, the armature region including an external boundary face having an undercut to interlockingly secure the elastomeric sealing element around the armature region, coating an outer surface of the magnet armature including the armature region with a protective layer, introducing a non-cross linked elastomeric material around the armature region, and cross-linking the elastomeric material by the action of pressure and heat to form the elastomeric sealing element around the armature region.

51. The manufacturing method according to claim 50, wherein the non-cross-linked elastomeric material is introduced into the armature region without introducing an adhesion promoter.

52. The manufacturing method according to claim 50, wherein an injection-molding technique is used to form the elastomeric sealing element.

53. The manufacturing method according to claim 50, wherein a thermoplastic elastomeric material is chosen for the elastomeric sealing element.

54. The manufacturing method according to claim 50, wherein the protective layer is a plastic layer.

55. The manufacturing method according to claim 50, further comprising the step of forming the undercut by making the external boundary face an inclined section in at least one portion.

56. The manufacturing method according to claim 50, wherein the undercut is formed by at least one recessed groove in the external boundary face.

57. The manufacturing method according to claim 50, wherein the undercut is formed by making the external boundary face one of a threaded segment and a toothed segment.

58. A method for producing a magnet armature to be used in a valve mechanism for controlling an electronic braking system comprising the steps of manufacturing a magnet armature including a cavity region for receiving an elastomeric sealing element, the cavity region including a boundary face having an undercut to interlockingly secure the elastomeric sealing element within the cavity region, coating an outer surface of the magnet armature including the cavity region boundary face with a protective layer, introducing a non-cross linked elastomeric material into the cavity region, and cross-linking the elastomeric material by the action of pressure and heat to form the elastomeric sealing element within the cavity region.

59. The manufacturing method according to claim 58, wherein the non-cross-linked elastomeric material is introduced into the cavity region without introducing an adhesion promoter.

60. The manufacturing method according to claim 58, wherein a thermoplastic elastomeric material is chosen for the elastomeric sealing element.

61. The manufacturing method according to claim 58, wherein the protective layer is a plastic layer.

62. The manufacturing method according to claim 58, further comprising the step of forming the undercut by making the cavity region boundary face an inclined section in at least one portion.

63. The manufacturing method according to claim 58, wherein the undercut is formed by at least one recessed groove in the cavity region boundary face.

64. The manufacturing method according to claim 58, wherein the undercut is formed by making the cavity region boundary face one of a threaded segment and a toothed segment.

* * * * *